US008534096B2

(12) United States Patent  (10) Patent No.: US 8,534,096 B2
Bennett  (45) Date of Patent: Sep. 17, 2013

(54) QUENCH STATION AND METHOD FOR FORMED GLASS SHEET QUENCHING (75) Inventor: Terry A. Bennett, Northwood, OH (US)

(73) Assignee: Glasstech, Inc., Perrysburg, OH (US)

(*) Notice: Subject to any disclaimer, the term of this patent is extended or adjusted under 35 U.S.C. 154(b) by 1126 days.

(21) Appl. No.: 11/692,429

(22) Filed: Mar. 28, 2007

(65) Prior Publication Data
US 2008/0236200 A1 Oct. 2, 2008

(51) Int. Cl.
C03B 27/044 (2006.01)

(52) U.S. Cl.
USPC .................................. 65/348; 65/114

(58) Field of Classification Search
USPC ............... 65/158, 104, 348, 114, 115, 161
See application file for complete search history.

(56) References Cited

U.S. PATENT DOCUMENTS

| | | | |
|---|---|---|---|
| 4,361,432 A | 11/1982 | McMaster et al. | |
| 4,493,723 A | 1/1985 | Evason | |
| 4,816,058 A | 3/1989 | Kuster et al. | |
| 4,874,418 A | 10/1989 | Kuster et al. | |
| 4,913,720 A | 4/1990 | Gardon et al. | |
| 5,147,439 A * | 9/1992 | Ritz | 65/158 |
| 5,368,624 A | 11/1994 | Lehto et al. | |
| 6,412,309 B1 * | 7/2002 | Kajii et al. | 65/348 |
| 6,513,348 B2 * | 2/2003 | Shetterly et al. | 65/104 |
| 6,543,255 B2 | 4/2003 | Bennett et al. | |
| 6,578,383 B2 | 6/2003 | Bennett et al. | |
| 2004/0237591 A1 * | 12/2004 | Shetterly et al. | 65/111 |

FOREIGN PATENT DOCUMENTS

| | | |
|---|---|---|
| CN | 2483388 Y | 3/2002 |
| CN | 1518526 A | 8/2004 |
| EP | 1 114 800 A1 | 7/2001 |
| GB | 1 212 208 | 11/1970 |
| JP | 62270430 A | 11/1987 |
| JP | 05501847 A | 4/1993 |
| JP | 2004530625 A | 10/2004 |

OTHER PUBLICATIONS

Supplementary European Search Report Dated Dec. 6, 2010, Applicant Glasstech, Inc., Application No. 08743992.3-2111, 7 Pages.
Chinese Office Action Dated Nov. 19, 2012, Application No. 200880014645.3, Applicant Glasstech, Inc.
Japanese Office Action (Notice of Reasons for Rejection) Dated Dec. 18, 2012, Yamada Kohichi et al., Application No. P2010-501080.

* cited by examiner

Primary Examiner — Richard Crispino
Assistant Examiner — Yana Belyaev
(74) Attorney, Agent, or Firm — Brooks Kushman P.C.

(57) ABSTRACT

A glass sheet quench station (16) and method for quenching glass sheets includes quench control valves (55, 57) that are operated to reduce unnecessary quenching air and thereby provide efficiency in the quenching.

18 Claims, 4 Drawing Sheets

QUENCH STATION AND METHOD FOR FORMED GLASS SHEET QUENCHING

BACKGROUND OF THE INVENTION

1. Field of the Invention

This invention relates to a quench station and a method for quenching formed glass sheets in an efficient manner.

2. Background Art

Systems for forming glass sheets by heating and then quenching the glass sheets to provide toughening have efficiencies that are reduced when the quench stations are constructed large enough to quench large formed glass sheets but are used with smaller formed glass sheets since much of the pressurized air used for the quenching at the quench lateral extremities does not impinge on the glass sheet to provide cooling. This also is the case when two or more smaller sheets are moved though a quench station side-by-side in a spaced relationship from each other such that at a central location and often lateral outward locations as well pressurized air flow is wasted since it does not impinge with the glass to provide cooling.

U.S. Pat. No. 4,361,432 McMaster et al. discloses glass sheet quenching between lower and upper quench heads with the formed glass sheet on an open center ring and, upon completion of the quenching, the downwardly directed quenching gas from the upper quench head is terminated to lift the glass sheet upwardly from the open center ring against the upper quench head to permit the ring to be moved to start another cycle. A delivery ring is moved under the formed glass sheet and the downwardly directed gas is again supplied to deposit the glass sheet on the delivery ring for delivery when the next formed glass sheet is moved to between the lower and upper quench heads for the quenching.

U.S. Pat. No. 6,513,348 Shetterly et al. discloses a quench station and method for quenching glass sheets with a reduced cycle time.

SUMMARY OF THE INVENTION

One object of the present invention is to provide an improved quench station for quenching formed glass sheets.

In carrying out the above object, the quench station for quenching formed glass sheets in accordance with the invention includes a conveyor for conveying a formed glass sheet along a direction of conveyance on an open center ring, and the quench station also includes at least one quench section into which the formed glass sheet is conveyed. The quench station includes lower and upper quench head assemblies respectively positioned below and above the conveyed glass sheet, and each quench head assembly includes a plurality of quench manifolds extending along the direction of conveyance and spaced from each other laterally with respect to the direction of conveyance at respective lateral locations. Each quench manifold has a plurality of quench openings spaced along the direction of conveyance and oriented toward the conveyed glass sheet. A quench plenum of the quench station is supplied pressurized air and a plurality of quench conduits respectively feed the pressurized air from the quench plenum to the quench manifolds with each quench manifold directing quench air at an associated lateral location. Valves respectively associated with some of the quench conduits selectively permit or prevent air flow therethrough so the quench station can be operated so quench air is only supplied at lateral locations where a formed glass sheet is located and is not supplied at lateral locations unoccupied by a formed glass sheet to be quenched. Both the lower and upper quench head assemblies have a plurality of actuators that each operate a plurality of valves associated with conduits that feed pressurized air to an associated quench manifold. A programmable valve controller operates the actuators so quench air is not supplied at lateral locations of the quench station not occupied by a glass sheet being quenched.

The lower and upper quench head assemblies include lateral outward quench manifolds with whose conduits the valves operate and also include lateral intermediate quench manifolds with whose conduits the valves operate, specifically both lateral outward quench manifolds and lateral intermediate manifolds with whose conduits the valves operate, and most preferably all of quench manifolds have valves with whose conduits the valves operate. Also, the quench plenum includes lower and upper quench plenum ducts from which the conduits respectively feed pressurized air to the quench manifolds of the lower and upper quench head assemblies.

The quench station also includes lower and upper supports embodied by linkages that respectively mount the quench manifolds of the lower and upper quench heads for adjustable positioning to accommodate formed glass sheets of different curved shapes, and the quench conduits are embodied by flexible hoses that permit adjustment for the different curved shapes.

More specifically, the quench section includes a primary upstream quench section and a secondary downstream quench section, with the quench plenum including upstream and downstream plenum sections, with conduits through which pressurized air is respectively fed from the upstream and downstream plenum sections to the quench heads of the upstream and downstream quench sections, and with valves respectively associated with at least a plurality of conduits of both the upstream and downstream quench sections to selectively permit or prevent air flow along longitudinally aligned locations along both the upstream and downstream quench sections.

Also, the control operates the valves are positioned in sets respectively associated with the quench manifolds, and the valves of each set are aligned along the direction of conveyance through both the upstream and downstream quench sections. Furthermore, the control includes a plurality of actuators, and each actuator operates all of the valves of one set to permit or prevent air flow to the conveyed glass sheets along the longitudinally aligned locations in both the upstream and downstream quench sections.

Another object of the present invention is to provide an improved method for quenching a formed glass sheet.

In carrying out the immediately preceding object, the method for quenching a formed glass sheet in accordance with the invention is performed by conveying a formed glass sheet along a direction of conveyance on an open center ring into a quench station including lower and upper quench head assemblies respectively positioned below and above the conveyed glass sheet with laterally spaced quench manifolds of the quench head assemblies having quench openings oriented toward the conveyed glass sheet at associated lateral locations. Pressurized air is supplied to less than all of the quench manifolds to provide pressurized air flows to the conveyed glass sheet for quenching thereof without supplying unnecessary air flows at lateral locations unoccupied by the glass sheet and that thus are not needed to provide the quenching.

More specifically, the pressurized air is supplied from a quench plenum having lower and upper ducts, with the pressurized air being supplied through conduits, and with valves of the conduits being operated to control the quench conduits through which the pressurized air flows are supplied.

The valves may be operated to prevent pressurized air flow to lateral outward quench manifolds, to lateral intermediate quench manifolds, or to all of the quench manifolds.

More specifically, the pressurized air is disclosed as being supplied to a primary upstream quench section and to a secondary downstream section of the quench station, and with the pressurized air supplied to the primary upstream quench section being at a higher pressure than the pressurized air supplied to the secondary downstream quench section. Furthermore, the pressurized air is supplied at each quench section from an associated quench plenum having lower and upper ducts, with the pressurized air being supplied through conduits, and with valves of the conduits operated to control the quench conduits through which the pressurized air flows are supplied.

The objects, features and advantages of the present invention are readily apparent from the following detailed description of the preferred embodiment when taken in connection with the accompanying drawings.

DETAILED DESCRIPTION OF THE PREFERRED EMBODIMENTS

Figure 1:
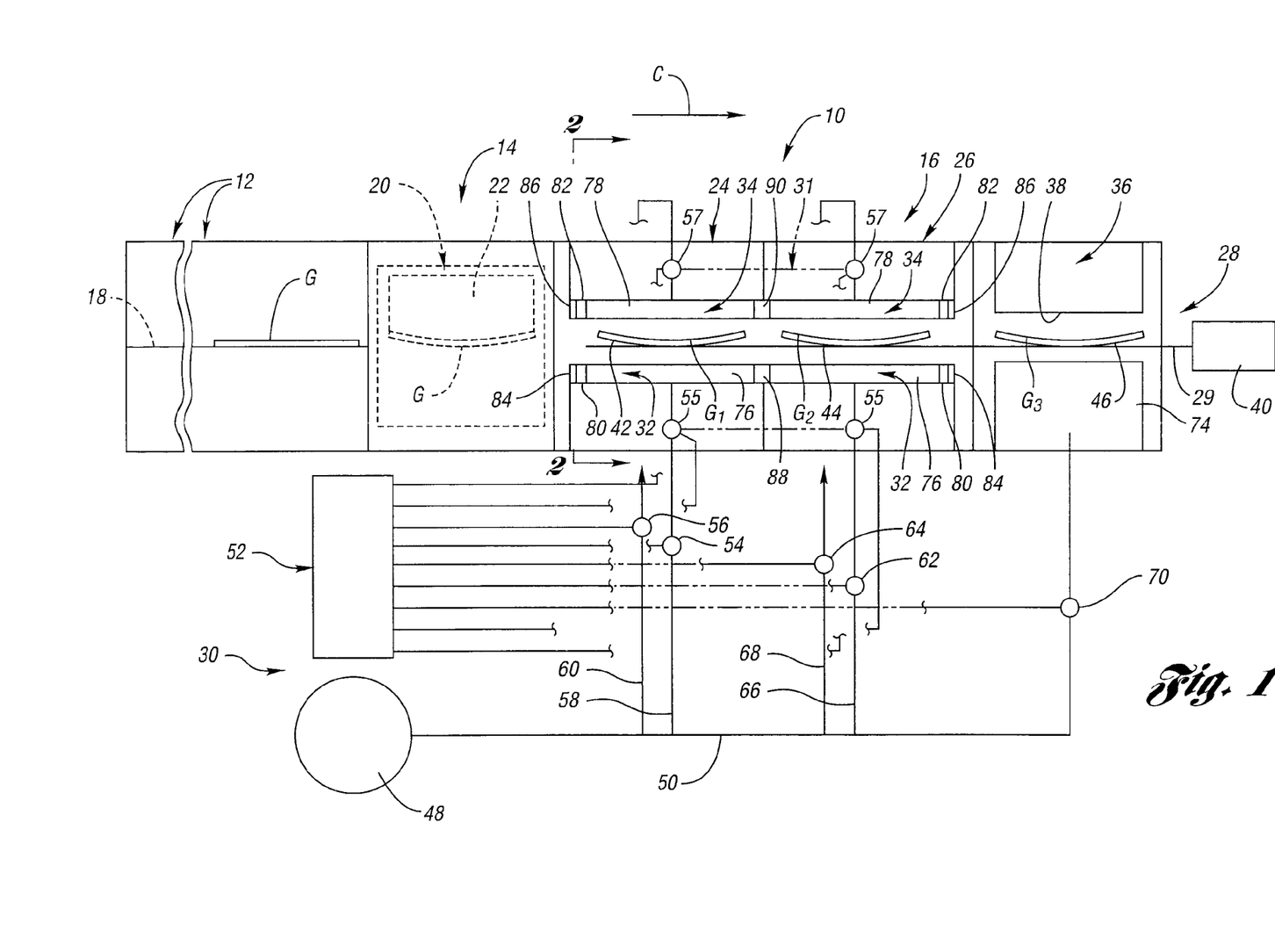
FIG. 1 is a schematic side elevational view of a glass sheet processing system including a quench station constructed in accordance with the invention to perform the quenching method of the invention.

With reference to FIG. 1, a glass sheet forming and quenching system generally indicated by 10 includes a furnace 12 for heating glass sheets, a forming station 14 for forming the heated glass sheets, and a quench station 16 that is constructed in accordance with the invention to provide the quenching method thereof as is hereinafter more fully described. The construction of the quench station 16 and its method of operation will be described in an integrated manner to facilitate an understanding of all aspects of the invention.

With continuing reference to FIG. 1, the furnace 12 of the system includes a conveyor 18 on which glass sheets G are heated within a heating chamber of the furnace to a sufficiently high temperature to permit forming and quenching of the glass. After the heating, the heated glass sheets G are transferred or conveyed in any suitable manner to the forming station 14 where forming apparatus 20 forms each heated glass sheet from a flat shape to a curved shape. After the forming, the heated glass sheet is supported as illustrated by an upper vacuum mold 22 in preparation for being transferred to the quench station 16 which, as mentioned above, is constructed in accordance with the present invention.

The quench station 16 of the invention as illustrated in FIG. 1 includes a first primary upstream quench section 24 and a second secondary downstream quench section 26. At the quench station 16, the conveyor of the system includes a shuttle 28 that simultaneously provides movement of three formed sheets $G_1$, $G_2$, and $G_3$ through the quench station as is hereinafter more fully described. In addition, the quench station also includes a control 30 that supplies quenching gas in a controlled manner which during cyclical operation moves the glass sheets upwardly from and subsequently downwardly back onto the shuttle 28 upon passage through the quench station. It should be noted that the formed glass sheets normally will have curvature in a transverse direction to the direction of conveyance through the quench station 26 and may also have curvature along the direction of conveyance as illustrated.

The furnace 12, forming station 14 and the quench 16 are generally of the construction disclosed by U.S. Pat. No. 6,513,348 Shetterly et al., U.S. Pat. No. 6,543,255 Bennett et al., and U.S. Pat. No. 6,578,383 Bennett et al. However, the quench station 16 as is hereinafter more fully described is also constructed to reduce quenching gas usage and thereby provide efficiency in the operation of the system to form and quench glass sheets. Furthermore, the forming system 10 may also be constructed to provide forming only at the forming station 14 downstream from the furnace or also at the exit end of the heated chamber furnace as disclosed by the aforementioned U.S. Pat. No. 6,578,383 Bennett et al. The disclosures of these prior patents are hereby incorporated by reference.

Figure 2:
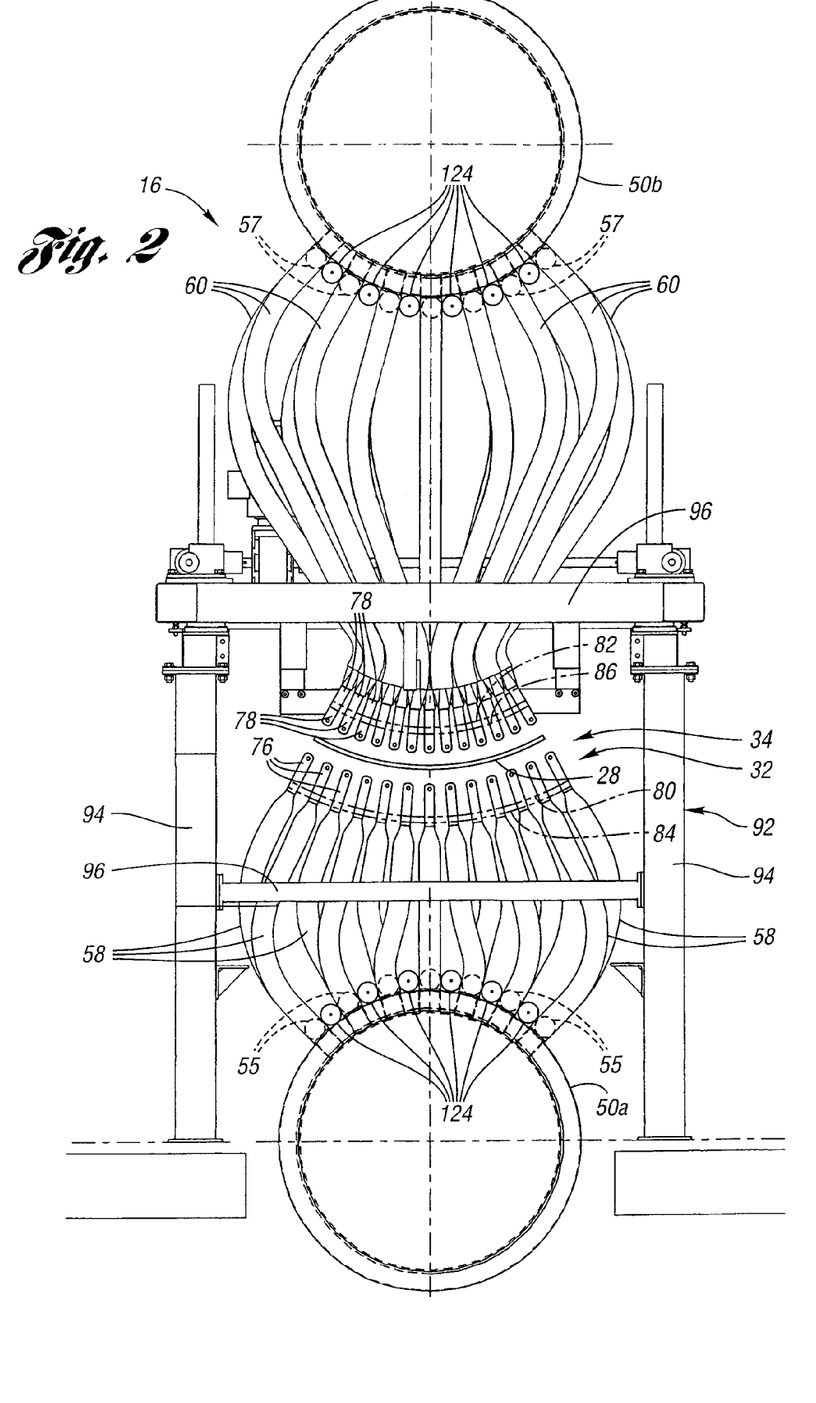
FIG. 2 is a cross sectional view taken through the quench station along the direction of line 2-2 in FIG. 1 to illustrate lower and upper quench head assemblies that respectively provide upwardly and downwardly directed quenching gas to quench a formed glass sheet therebetween under the control of valves of the quench head assemblies.

As illustrated by FIGS. 1 and 2, the first quench section 24 has lower and upper quench head assemblies 32 and 34 for respectively supplying upwardly and downwardly directed quench gas to a formed glass sheet therebetween to provide partial quenching of the formed glass sheet. The quenching provided by the first quench section 24 is insufficient without further forced cooling in addition to natural convention to prevent loss of the glass temperature differential that toughens the glass upon final cooling to ambient temperature, either by heat strengthening or more rapid cooling that provides tempering. The second quench section 26 of the quench station also has lower and upper quench head assemblies 32 and 34 for respectively supplying upwardly and downwardly directed quenching gas to the partially quenched glass sheet upon being received therebetween during the shuttle transfer cycle described below. This quenching in the second quench station 26 completes the quenching of the glass sheet to provide heat strengthening or tempering as required by the particular manufacturing job being processed. Downstream to the right of the second quench section 26, the quench station includes an after-cooling section 36 having an upper stop 38 against which a quenched glass sheet is supported during the transfer cycle in preparation for being transferred to an unshown after-cooling conveyor and ultimate delivery from the system.

The conveyor shuttle 28 illustrated in FIG. 1 is movable along a transfer direction that corresponds with the direction conveyance C toward the right through the system and is moved by an actuator 40 so as to be simultaneously moved with respect to the forming station 14 where each glass sheet is formed, the first quench section 24, and the second quench section 26 as well as the after-cooling section 36. The shuttle 28 has three positions each of which includes an associated open ring 42, 44 and 46 for respectively supporting and transferring three glass sheets during each movement toward the right. More specifically, the shuttle 28 simultaneously moves the one glass sheet $G_1$ from the forming station 14 to the first quench section 24 as shown, the second glass sheet $G_2$ from the first quench section 24 to the second quench section 26 as shown, and the third glass sheet $G_3$ from the second quench section 26 to the after-cooling section 36 for transfer to the unshown after-cooling conveyor and ultimate delivery as previously mentioned.

As illustrated further in FIG. 1, the gas quench control 30 includes a source 48 of pressurized quenching gas that is delivered to the quench station through a main supply duct 50. A valve controller 52 controls valves 54 and 56 that respectively control flow through delivery conduits 58 and 60 to the lower and upper quench head assemblies 32 and 34 of the first quench section 24. Valve controller 52 also controls valves 62 and 64 that control the flow of quenching gas through conduits 66 and 68 that supply the lower and upper quench head assemblies 32 and 34 of the second quench station 26. In addition, the valve controller 52 controls a valve 70 that controls the flow of quenching gas 72 to a lower blowup plenum 74 that supplies upwardly directed quench gas at the after-cooling station 36. The gas quench control 30 also includes a control valve system collectively indicated by 31 and having lower and upper quench valves schematically indicated by 55 and 57, respectively, for providing efficiency in the quenching as is hereinafter more fully described.

Each cycle of operation of the shuttle 28 illustrated in FIG. 1 is performed by moving the shuttle from the left toward the right to the position illustrated to transfer three glass sheets, one glass sheet $G_1$ from the forming station 14 to the first quench section 24, the second glass sheet $G_2$ from the first quench section 24 to the second quench section 26, and the third glass sheet $G_3$ from the second quench section 26 to the after-cooling section 36. With the shuttle positioned as shown in FIG. 1, the quenching gas is supplied under the operation of control 30 to the first and second formed glass sheets $G_1$ and $G_2$ for a sufficient time to provide the partial quenching of the first glass sheet $G_1$ and to complete the quenching of the second glass sheet $G_2$. The time involved for such quenching will depend upon the glass thickness but will normally be about 1½ to 2 seconds. The control 30 then provides a change in the gas flow force applied to the glass sheets to provide lifting thereof upwardly off of the associated shuttle rings 42, 44 and 46. Thus, the glass sheet $G_1$ is moved upwardly against the upper quench head assembly 34 of the first quench section 24, the second glass sheet $G_2$ is moved upwardly against the upper quench head assembly 34 of the second quench section 26, and the third glass sheet $G_3$ is moved upwardly against the stop 38 of the after-cooling section 36. The quenching proceeds at this time with the lower quench head assemblies 32 of both the first and second quench sections 24 and 26 continuing to supply upwardly directed quenching gas and with the upper quench head assemblies 34 continuing to supply downwardly directed quenching gas. Simultaneously, the movement of the shuttle 28 back toward the left permits commencement of another cycle as the glass sheets progress through the quench station from the left toward the right with three being moved during each shuttle movement toward the right. Prior to the commencement of each cycle, the quenching gas supplied to the first and second quench sections 24 and 26 is changed by the control 30 to release the formed glass sheets from their associated upper quench head assemblies 34 to allow the glass sheet thereof to respectively drop downwardly onto the shuttle rings 44 and 46 in preparation for respective movement from the first quench section 24 to the second quench section 26 and for movement from the second quench section 26 to the after-cooling section 36. The change in the gas flows to lift the glass sheets can be done by: (1) increasing the upward gas flow; (2) decreasing the downward gas flow; or (3) both increasing the upward gas flow and decreasing the downward gas flow.

When the glass sheets are forced upwardly against the upper quench head assemblies 34 in both the first and second quench section 24 and 26 shown in FIG. 1, the greater supply of upwardly directed quenching gas relative to the amount of downwardly directed quenching gas is offset by the fact that the glass sheets are positioned closer to the upper quench head assemblies 34 so that the cooling provided is more uniform from both the lower and upper sides.

As illustrated in FIGS. 1 and 2, the lower and upper quench head assemblies 32 and 34 each include a plurality of quench manifolds 76 and 78, respectively, through which quenching gas is supplied upwardly and downwardly through openings in the opposed faces of the quench heads. Furthermore, as shown in FIG. 1, the upstream ends of the lower and upper quench manifolds 76 and 78 are respectively connected by lower and upper linkages 80 and 82 and are positioned by lower and upper templates 84 and 86. Likewise, the downstream ends of the lower and upper quench manifolds 76 and 78 of the second quench section 26 are also respectively connected by lower and upper linkages 80 and 82 and are positioned by lower and upper templates 84 and 86. Furthermore, while the lower and upper quench manifolds 76 and 78 of the lower and upper quench head assemblies 32 and 34 of the first and second quench section 24 and 26 are fluidly isolated from each other, their respective downstream and upstream ends have mechanical lower and upper connectors 88 and 90 so as to be movable and positioned with each other in association with the lower and upper linkages 80 and 82 and the lower and upper templates 84 and 86.

As shown in FIG. 2, the quench station includes a framework 92 including vertical posts 94 and horizontal beams 96 on which the lower and upper quench head assemblies 32 and 34 are mounted. Both the lower and upper linkages 80 and 82 have a construction as disclosed by the previously mentioned U.S. Pat. No. 6,513,348, which has been incorporated herein by reference, and the quench manifolds of the lower and upper quench head assemblies 32 and 34 supported thereby are adjustable with respect to each other to permit quenching of different shapes of formed glass sheets.

Figure 4:
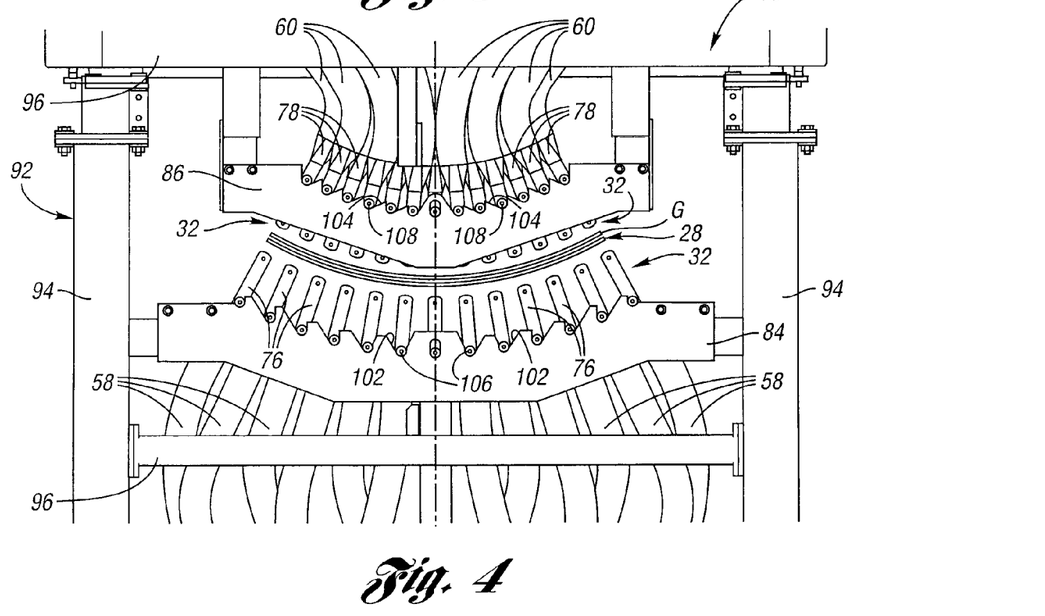
FIG. 4 is a partial view taken through the quench station generally in the same direction as FIG. 2 and illustrates quench of a formed glass sheet that extends the entire width of the quench head assemblies.
Figure 5:
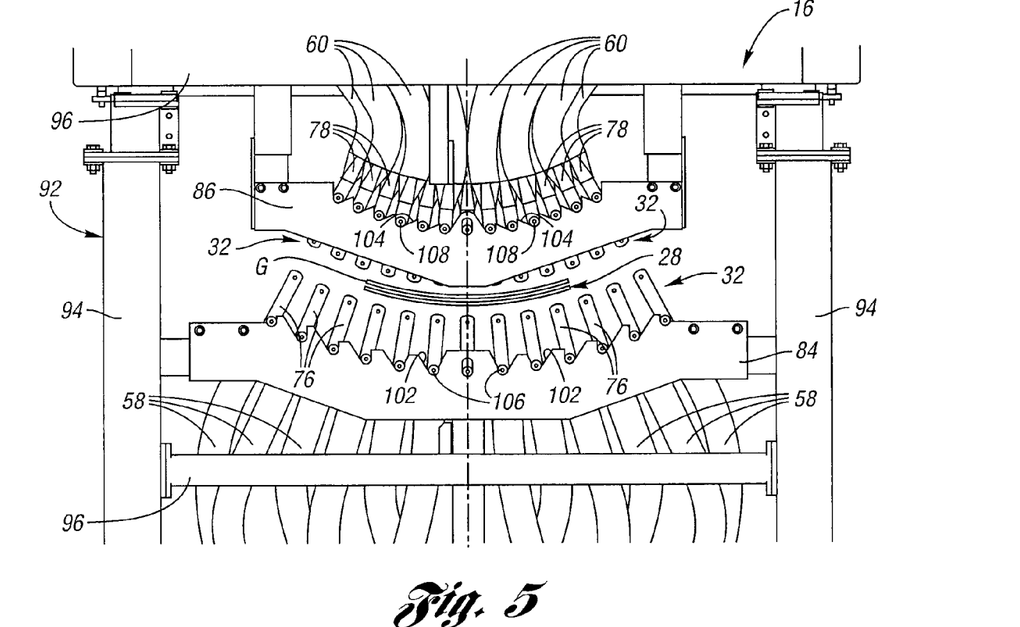
FIG. 5 is a partial view similar to FIG. 4 but illustrating quenching of a formed glass sheet that extends less than the entire width of the quench head assemblies.
Figure 6:
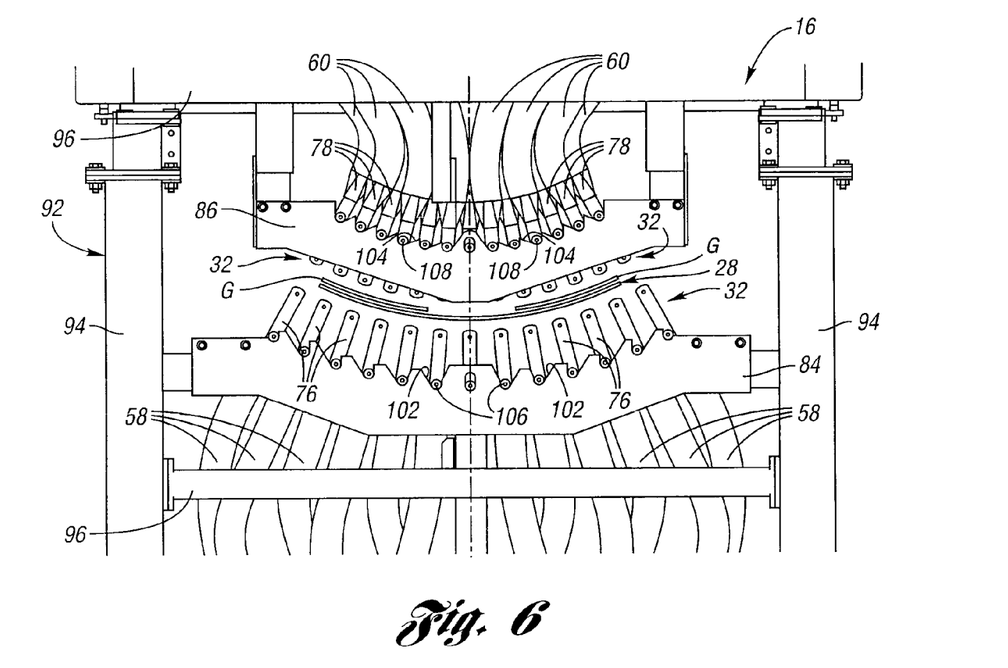
FIG. 6 is a partial view also similar to FIG. 4 but illustrating quenching of a pair of formed glass sheets.

As shown in FIGS. 4-6, the lower and upper templates 84 and 86 are supported by the framework 92 and have upwardly facing positioning notches 102 and 104 that receive lower and upper positioners 106 and 108 on the adjacent ends of the lower and upper quench manifolds 76 and 78 to provide proper positioning of the quench manifolds with the associated linkages providing the proper angular location of the lower and upper quench manifolds with respect to each other.

As illustrated in FIG. 2, a quench plenum to which lower and upper pressurized quenching gas supply ducts $50_a$ and $50_b$ supply pressurized quenching gas to flexible lower and upper conduits 58 and 60 that respectively supply quenching gas to the lower and upper quench manifolds 76 and 78 of the lower and upper quench head assemblies 32 and 34.

The lower and upper linkages 80 and 82 of the lower and upper quench head assemblies 32 and 34 as mentioned above ensure that the opposed faces of the lower and upper quench manifolds 76 and 78 are aligned with each other in order to provide uniform distribution of quenching gas to the quenched glass sheet G therebetween. Furthermore, lower and upper adjusters respectively associated with the lower and upper templates 84 and 86 provide proper positioning of the templates on the framework 92 in order to provide the proper positioning of the lower and upper quench manifolds 76 and 78 in association with the angular positioning provided by the lower and upper linkages. Each adjuster includes a threaded adjusting member that is received by a threaded member on the associated template and has a lower end engaged with a support lug on the framework 92 such that threading of the adjusting member provides upward and downward movement of the template to the proper location. Upon such proper positioning, a lock nut on the adjusting member is threaded against the template mounted member to secure the adjusted position.

Also, lower and upper clamps respectively associated with the lower and upper templates 84 and 86 provide clamping of the templates to the framework 92 after the adjustment provided by the lower and upper adjusters as described above. The lower and upper clamps include clamp members that are operated by clamp actuators in any conventional manner to clamp the associated template against the framework 92 and prevent any movement thereof after the adjustment of the templates to the proper position. Clamp connectors of each clamp extend from the clamp member to the clamp actuator and are received within downwardly opening notches in the lower side of the associated template so as to permit the upward and downward adjusting movement as necessary until the template is in the proper position for the clamping.

For a more complete description of the support of the lower and upper quench head assemblies 32 and 34, one should refer to the previously mentioned U.S. Pat. No. 6,513,348 Shetterly et al. which has been incorporated herein by reference.

Figure 3:
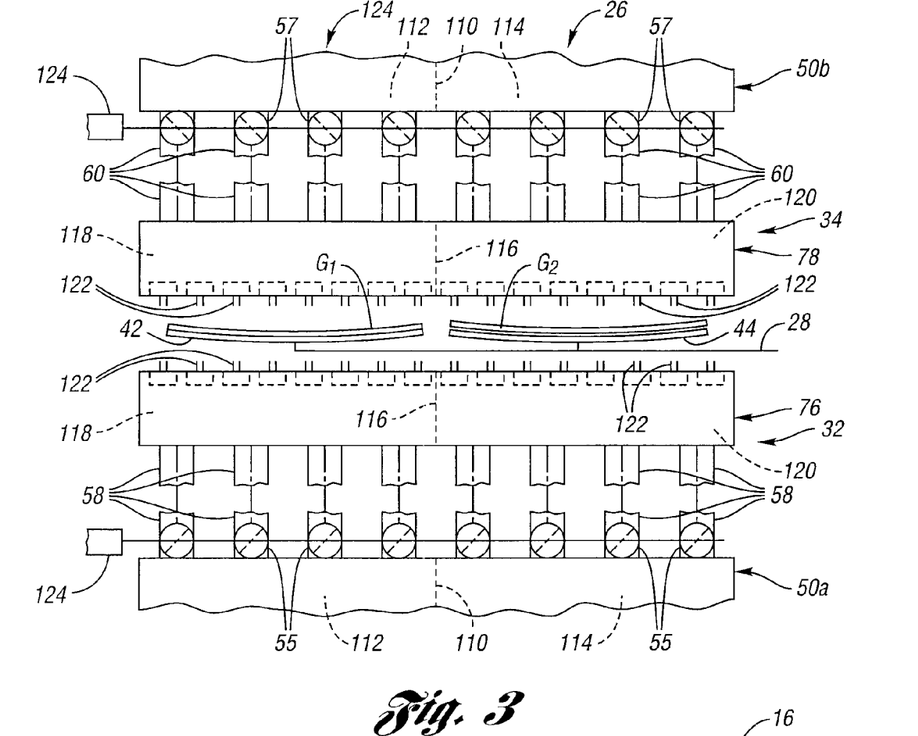
FIG. 3 is an enlarged view of a portion of FIG. 1 to more fully illustrate the lower and upper quench head assemblies and the valves that control the quenching.

As illustrated schematically in FIG. 3, the pressurized air quench plenum provided by the lower and upper ducts 50a and 50b each has a separating wall 110 so as to have upstream and downstream plenum sections 112 and 114 such that different pressures can be supplied to the first and second quench sections 24 and 26 as needed during the quenching operation. Likewise, each lower and upper manifold 76 and 78 also has a separating wall 116 so as to have upstream and downstream manifold sections 118 and 120 such that the pressurized quenched air supplied by the manifolds also has different pressures at the first and second quench sections 24 and 26. Each lower and upper manifold 76 and 78 has a plurality of quench openings 122 spaced along the direction of conveyance and oriented toward the conveyed glass sheets on the shuttle 28 of the system conveyor.

As shown in FIGS. 2 and 3, a plurality of the flexible conduits or hoses 58 and 60 respectively extend between the lower and upper quench ducts 50a and 50b and the lower and upper manifolds 76 and 78 to supply the pressurized quench air to the glass sheet being quenched while permitting adjustment of the lower and upper quench head assemblies 32 and 34 when switching between different jobs having formed glass sheets of different curvatures.

As illustrated in FIGS. 2 and 3, the previously mentioned quenched valve control system 31 has the lower and upper quench valves 55 and 57 associated with each of the lower and upper conduits 58 and 60 supplying each of the lower and upper manifolds 76 and 78 from the lower and upper quench plenum ducts 50a and 50b. A plurality of actuators 124 operate the control valves 55 and 57 that are associated with the conduits that feed each of the lower and upper manifolds 76 and 78. These actuators 124 are operated by the programmable valve controller 52 (FIG. 1) so that quenching gas is not supplied in areas of the quench not occupied by the particular glass sheet being quenched. In other words, the quenching gas is only supplied to the formed glass sheet and not to the unoccupied areas of the quench so as to reduce the cost involved with operating the quenching.

As illustrated in FIG. 4, the formed glass sheet G occupies the entire area between the lower and upper quench head assemblies 32 and 34 such that all of the lower and upper quench control valves 55 and 57 will then be opened to supply quenching air to the entire quench.

When the quenching is conducted as illustrated in FIG. 5 with a glass sheet is located in the central area of the quench, the lower and upper quench head assemblies 32 and 34 have the lateral outward lower and upper quench manifolds 76 and 78 closed so as to eliminate unnecessary quenching gas at these locations where the formed glass sheet is not present.

When the quenching is conducted as illustrated in FIG. 6 with two smaller formed glass sheets G spaced laterally from each other, the lower and upper quench control valves associated with one or more of the central lower and upper manifolds 76 and 78 are closed to eliminate unnecessary quenching gas. Likewise, as illustrated, the formed glass sheets are located inward from the outboard extremity of the quench and one or more of the lateral outboard lower and upper manifolds 76 and 78 have their associated control valves closed to terminate any unnecessary quenching gas.

While it is possible for some applications not to require the quench control valves with all of the lower and upper manifolds across the entire width of the quench such as when the system is designed to operate with only specific jobs for which certain of the manifolds will always be open, the preferred embodiment disclosed has the control valves associated with each laterally spaced quench manifold so that the system is adaptable to provide quenching of any specific job with certain manifolds closed such as described above. Also, it should be appreciated that the invention can be practiced with a single quench station even though the use of both upstream and downstream quench stations as disclosed is preferred.

While the preferred embodiment of the invention has been described, those familiar with the art to which the invention relates will recognize various alternative designs and embodiments for practicing the invention as defined by the following claims.

What is claimed is:

1. A quench station for quenching a formed glass sheet, comprising:
a conveyor for conveying a formed glass sheet along a direction of conveyance, the conveyor including an open center ring;
at least one quench section into which the formed glass sheet is conveyed on the open center ring, the quench station including lower and upper quench head assemblies respectively positioned below and above the conveyed glass sheet on the center open ring;
each quench head assembly including a plurality of quench manifolds extending along the direction of conveyance spaced from each other laterally with respect to the direction of conveyance at respective lateral locations, and each quench manifold having a plurality of quench openings spaced along the direction of conveyance and oriented toward the conveyed glass sheet on the open center ring;
a quench plenum to which pressurized air is supplied;
a plurality of quench conduits for respectively feeding pressurized air from the quench plenum to the quench manifolds of both the lower and upper quench head assemblies to provide upwardly and downwardly directed quench air to the formed glass sheet on the open center ring with each quench manifold directing quench air at an associated lateral location;

valves respectively associated with at least some of the quench conduits of both the lower and upper quench head assemblies to selectively permit or prevent air flow therethrough to the associated quench manifolds so the quench station can be operated so quench air is only supplied at lateral locations where a formed glass sheet is located on the open center ring and is not supplied at lateral locations unoccupied by a formed glass sheet to be quenched;

both the lower and upper quench head assemblies having a plurality of actuators that each operate a plurality of valves associated with conduits that feed pressurized air to an associated quench manifold; and a programmable valve controller that operates the actuators so quench air is supplied to lateral locations occupied by a glass sheet to be quenched on the open center ring but is not supplied at lateral locations of the quench station not occupied by a glass sheet being quenched.

2. A formed glass sheet quench station as in claim 1 wherein the lower and upper quench head assemblies include lateral outward quench manifolds with whose conduits the valves operate.

3. A formed glass sheet quench station as in claim 1 wherein the lower and upper quench head assemblies include central quench manifolds with whose conduits the valves operate.

4. A formed glass sheet quench station as in claim 1 wherein the lower and upper quench head assemblies include both lateral outward quench manifolds and central manifolds with whose conduits the valves operate.

5. A formed glass sheet quench station as in claim 1 wherein all of quench manifolds have valves with whose conduits the valves operate.

6. A formed glass sheet quench station as in claim 1 wherein the quench plenum includes lower and upper quench plenum ducts from which the conduits respectively feed pressurized air to the quench manifolds of the lower and upper quench head assemblies.

7. A formed glass sheet quench station as in claim 1 further including lower and upper supports that respectively mount the quench manifolds of the lower and upper quench head assemblies for adjustable positioning to accommodate formed glass sheets of different curved shapes, and the quench conduits being flexible hoses that permit adjustment for the different curved shapes.

8. A formed glass sheet quench station as in claim 1 which includes a primary upstream quench section and a secondary downstream quench section, the quench plenum including upstream and downstream plenum sections, conduits through which pressurized air is respectively fed from the upstream and downstream plenum sections to the lower and upper quench head assemblies of both the upstream and downstream quench sections, and valves respectively associated with at least a plurality of conduits of the lower and upper quench head assemblies of both the upstream and downstream quench sections to selectively permit or prevent air flow along longitudinally aligned locations along both the upstream and downstream quench sections.

9. A formed glass sheet quench station as in claim 8 wherein the valves are positioned in sets with the valves of each set aligned along the direction of conveyance through both the upstream and downstream quench sections, and each actuator operating all of the valves of one set to permit or prevent air flow to the conveyed glass sheets along the longitudinally aligned locations of the lower and upper quench head assemblies in both the upstream and downstream quench sections.

10. A quench station for quenching a formed glass sheet, comprising:

a conveyor for conveying a formed glass sheet along a direction of conveyance, the conveyor including an open center ring;

a primary upstream quench section and a secondary downstream quench section through which the formed glass sheet is conveyed on the open center ring;

each quench section including lower and upper quench head assemblies respectively positioned below and above the conveyed glass sheet on the open center ring;

each quench head assembly including a plurality of elongated quench manifolds each of which has upstream and downstream ends, the quench manifolds extending along the direction of conveyance and being spaced from each other at respective lateral locations, each quench manifold having a plurality of quench openings spaced along the direction of conveyance and oriented toward the conveyed glass sheet, and the downstream ends of the quench manifolds of the upstream quench sections being connected to the upstream ends of aligned quench manifolds of the downstream quench sections;

linkages that respectively support the upstream ends of the primary quench manifolds and the downstream ends of the secondary quench manifolds with the quench manifolds spaced from each other laterally with respect to the direction of conveyance;

a quench plenum including lower and upper quench plenum ducts each of which has a primary upstream section and a secondary downstream section to which pressurized air is supplied;

a plurality of quench conduits for respectively feeding pressurized air from the upstream and downstream sections of the lower and upper quench plenum ducts to the upstream and downstream quench sections at the quench manifolds of the lower and upper quench head assemblies to provide upwardly and downwardly directed quench air to the formed glass sheet on the open center ring with each quench manifold directing quench air at an associated lateral location; and sets of valves respectively associated with the conduits of the connected upstream and downstream quench manifolds of the lower and upper quench head assemblies to selectively permit or prevent air flow therethrough to the associated quench manifold so the quench station can be operated so quench air is only supplied at lateral locations where a formed glass sheet is located on the open center ring and is not supplied at lateral locations unoccupied by a formed glass sheet to be quenched;

a plurality of actuators that each operate a plurality of valves associated with conduits that feed pressurized air to associated quench manifolds of both the lower and upper quench head assemblies; and a programmable valve controller that operates the actuators so quench air is supplied to lateral locations occupied by a glass sheet to be quenched but is not supplied at lateral locations of the quench station not occupied by a glass sheet being quenched.

11. A method for quenching a formed glass sheet, comprising:

conveying a formed glass sheet on an open center ring along a direction of conveyance into a quench station including lower and upper quench head assemblies respectively positioned below and above the conveyed glass sheet with laterally spaced quench manifolds of the quench head assemblies having quench openings oriented toward the conveyed glass sheet for providing upwardly and downwardly directed quench air to the formed glass sheet with each quench manifold extending along the direction of conveyance and being spaced from each other laterally with respect to the direction of conveyance so as to direct quench air at an associated lateral location; and supplying pressurized air to less than all of the quench manifolds to provide upwardly and downwardly directed pressurized air flows to the conveyed glass sheet on the open center ring for quenching thereof without supplying unnecessary air flows that are not needed to provide the quenching at lateral locations of the quench station not occupied by a formed glass sheet to be quenched.

12. A method for quenching a formed glass sheets as in claim 11 wherein the pressurized air is supplied from a quench plenum having lower and upper ducts, the pressurized air being supplied through conduits, and valves of the conduits being operated to control the quench conduits through which the pressurized air flows are supplied.

13. A method for quenching a formed glass sheet as in claim 12 wherein the valves are operated to prevent pressurized air flow to lateral outward quench manifolds.

14. A method for quenching a formed glass sheet as in claim 12 wherein the valves are operated to prevent pressurized air flow to lateral central quench manifolds.

15. A method for quenching a formed glass sheet as in claim 12 wherein the valves are selectively operated to prevent pressurized air flow to all of the quench manifolds.

16. A method for quenching formed glass sheets as in claim 11 wherein the pressurized air is supplied to a primary upstream quench section and to a secondary downstream section of the quench station with the pressurized air supplied to the primary upstream quench section being at a higher pressure than the pressurized air supplied to the secondary downstream quench section.

17. A method for quenching a formed glass sheets as in claim 16 wherein the pressurized air is supplied at each quench section from an associated quench plenum having lower and upper ducts, the pressurized air being supplied through conduits, and valves of the conduits being operated to control the quench conduits through which the pressurized air flows are supplied.

18. A method for quenching a formed glass sheet, comprising:

conveying a formed glass sheet on an open center ring along a direction of conveyance into a quench station including lower and upper quench head assemblies respectively positioned below and above the conveyed glass sheets with laterally spaced quench manifolds of the quench head assemblies having quench openings oriented toward the conveyed glass sheet for providing upwardly and downwardly directed quench air to the formed glass sheet with each quench manifold extending along the direction of conveyance and being spaced from each other laterally with respect to the direction of conveyance so as to direct quench air at an associated lateral location, and supporting the lower and upper quench head assemblies by upstream and downstream linkages;

supplying pressurized air from lower and upper ducts of a quench plenum to conduits that are respectively connected to the quench manifolds of the lower and upper quench head assemblies; and operating valves of the conduits to supply the pressurized air to less than all of the quench manifolds to provide upward and downward pressurized air flows to the conveyed glass sheet on the open center ring for quenching thereof without supplying unnecessary air flows that are not needed to provide the quenching at lateral locations of the quench station not occupied by a formed glass sheet to be quenched.

* * * * *